(12) United States Patent
Nieuwoudt (10) Patent No.: US 7,722,945 B2
(45) Date of Patent: May 25, 2010

(54) RANDOM PACKING ELEMENTS AND COLUMN CONTAINING SAME

(75) Inventor: Izak Nieuwoudt, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 141 days.

(21) Appl. No.: 11/866,278

(22) Filed: Oct. 2, 2007

(65) Prior Publication Data

US 2008/0085400 A1    Apr. 10, 2008

Related U.S. Application Data

(60) Provisional application No. 60/828,900, filed on Oct. 10, 2006.

(51) Int. Cl.
*B01D 3/26* (2006.01)

(52) U.S. Cl. .................. 428/174; 261/94; 261/DIG. 72

(58) Field of Classification Search ....................... None
See application file for complete search history.

(56) References Cited

U.S. PATENT DOCUMENTS

| | | | |
|---|---|---|---|
| 4,277,425 A | 7/1981 | Leva | |
| 4,327,043 A | 4/1982 | Leva | |
| 4,333,892 A * | 6/1982 | Ellis et al. | 261/94 |
| 4,376,081 A * | 3/1983 | Leva | 261/94 |
| 4,554,114 A * | 11/1985 | Glen et al. | 261/95 |
| 5,112,536 A | 5/1992 | McNulty et al. | |
| 5,304,328 A | 4/1994 | Dolan | |
| 5,314,645 A | 5/1994 | Rukovena | |
| 5,411,681 A | 5/1995 | Seah et al. | |
| 5,543,088 A | 8/1996 | Halbirt | |
| D379,096 S | 5/1997 | Moore | |
| 5,688,444 A | 11/1997 | Koshy | |
| 5,882,772 A | 3/1999 | Schultes | |
| 6,007,915 A | 12/1999 | Rukovena | |
| 6,102,376 A | 8/2000 | Fei et al. | |
| D445,029 S | 7/2001 | Niknafs | |
| 6,387,534 B1 | 5/2002 | Niknafs | |
| 6,547,222 B2 | 4/2003 | Blischak et al. | |

* cited by examiner

*Primary Examiner*—David R Sample
*Assistant Examiner*—Nathan E Comstock
(74) *Attorney, Agent, or Firm*—Hovey Williams LLP

(57) ABSTRACT

A saddle-shaped random packing element is provided with laterally spaced, arcuate side members and a plurality of inner and outer rib elements that extend from and between the side members to form an interior volume. At least one lesser rib element extends from the side members and is at least partially positioned within the interior volume so that at least about 20 percent of the surface area of the packing element is positioned within the interior volume.

41 Claims, 10 Drawing Sheets

RANDOM PACKING ELEMENTS AND COLUMN CONTAINING SAME

CROSS-REFERENCE TO RELATED APPLICATION

This application claims the priority benefits under 35 U.S.C. §119(e) of provisional application Ser. No. 60/828,900, filed on Oct. 10, 2006, the entirety of the disclosure of which is hereby specifically incorporated herein by this reference thereto.

BACKGROUND OF THE INVENTION

The present invention relates generally to mass transfer devices for use with chemical process and mass transfer reactors and columns and, more particularly, to random packing elements for use in such reactors and columns. The invention also relates to methods of making and using such random packing elements.

Random or dumped packing elements are normally employed in gas-liquid or liquid-liquid contact towers or columns to provide mass transfer surfaces between a downwardly flowing fluid, typically a liquid stream, and an upwardly ascending fluid, typically gas or vapor stream or another liquid stream. Random packing elements may be used in a variety of chemical and treatment processes, such as, for example, rectification, stripping, fractionating, absorbing, separating, washing, extraction, or any other chemical, heat exchange, or treatment-type processes. Generally, the discrete random packing elements have a specific geometric shape and are designed to maximize performance for a given mass transfer surface area. Because the random packing elements are generally dumped or randomly packed into the column shell in an arbitrarily orientated packed bed, it is desirable for the individual random packing elements to have both high mass transfer efficiency and good hydraulic capacity when positioned in multiple rotational orientations within the packed bed.

Random packing elements of the prior art exist in a variety of shapes and materials. In general, random packing elements are constructed of metal, ceramic-type material, plastics, glass, or the like. Commonly, random packing elements are cylindrical, arcuate or "saddle-shaped" or have other, non-arcuate shapes such as spherical, toroidal, and the like. One disadvantage of the random packing elements of the prior art is that often the performance of the element is highly dependent on its configuration and its orientation with respect to the direction of flow of fluid streams through the element within the packed bed. For example, a Pall ring is a well-known cylinder-type packing that has a plurality of slotted walls and internal tongues or projections. When viewed along its longitudinal axis, the Pall ring presents very little surface area for mass transfer, but, when viewed perpendicularly to its longitudinal axis, the element presents a very large surface area. Because of this difference, the surface areas available for vapor/liquid or liquid/liquid contact vary with the orientation of the element, which, ultimately, affects the element's performance. In addition, the large surface area in the direction perpendicular to the longitudinal axis of the Pall ring is disadvantageous in that it tends to "shield" or inhibit fluid flow through immediately adjacent rings in the downstream flow direction.

A random packing element having a more uniform distribution of surface area throughout its entire volume is disclosed in U.S. Pat. No. 5,112,536 (also referred to herein as the '536 patent). The saddle-shaped random packing element disclosed therein includes alternating arched inner and outer rib elements that define an interior volume. While the packing element disclosed in the '536 patent provides improvements over other random packing elements of the prior art, it also includes limitations that can hinder its performance. For example, the curvature of the packing element disclosed in the '536 patent causes the inner rib elements to be positioned closely together in the same curved plane, thereby restricting the flow paths for fluid streams passing through the element. In addition, because the ribs of the packing element of the '536 patent are generally centrally longitudinally aligned, the first rib element encountered by a fluid stream typically shields the subsequent rib elements from fluid contact. This shielding effect can reduce mass transfer efficiency by reducing the element's effective surface area for mass and/or heat transfer.

Another type of random packing element is disclosed in U.S. Pat. No. 5,882,772. In that patent, a plurality of individual strips is provided and each strip extends in a generally sinusoidal fashion between planar outer web attachment areas. A similar random packing element is disclosed in U.S. Pat. No. 5,543,088 in which a plurality of strips extends between planar end attachment areas. In both of these patents, the individual strips are connected together along their midpoints, thereby providing an area where the strips are crowded together and through which passage of gas is impeded. In addition, the packing elements must be made from material of sufficient thickness and strength to resist deformation of the planar outer webs or attachment areas. It would be desirable for the random packing element to have a configuration that resists deformation using relatively thinner gauge material.

Thus, a need exists for a random packing element that maintains high mass transfer efficiency and good hydraulic capacity when positioned in multiple different rotational orientations within the packed bed. Advantageously, the packing element should be easily manufactured with little or no waste material and possess a configuration that more readily resists the type of deformation described above.

BRIEF SUMMARY OF THE INVENTION

In one aspect, the present invention provides a saddle-shaped random packing element with a generally uniform open flow volume when positioned in multiple rotational orientations in relation to the direction of flow of fluids encountering the packing element. The saddle-shaped element of the present invention comprises a pair of laterally spaced, longitudinally elongated, arcuate side members which may include radially upright flanges. The side members cooperatively define a longitudinal axis of the inventive packing element. In addition, the packing element comprises a plurality of inner and outer arched rib elements extending from and between the side members to cooperatively define an interior volume within the packing element. The inner and/or outer rib elements may be aligned with or alternatingly misaligned from the longitudinal axis of the packing element. The outer rib elements can have a width which is the same as or up to or more than twice the width of the inner rib elements. The total number of inner and outer rib elements can be in the range of from about 3 to about 20. The use of the term "arched" in describing the rib elements is intended to encompass rib elements that have a curved shape as well as those formed from multiple straight lines, such as those having a "V" shape, or combinations of curves and straight lines.

The saddle-shaped random packing element of the present invention also comprises at least one rib element that is of a lesser height than the inner and outer rib elements and is longitudinally disposed between consecutive inner and/or outer rib elements. The lesser rib element includes at least one drip point and is at least partly disposed in the interior volume of the packing element. The lesser rib elements can be at least partly continuous or at least one rib element may be made discontinuous to thereby create two shorter rib segments that each have a free end. The rib segments can be independently positioned, such as by being bent in radially opposite directions or in the same radial direction.

In accordance with one embodiment of the present invention, at least about 20 percent of the total surface area of the random packing element is defined within the interior volume. Compared to random packing elements of the prior art, the shape and configuration of the inventive element increase mass transfer efficiency by providing a more uniform surface area distribution and less restricted fluid flow paths when the packing elements are positioned in multiple different rotational orientations within a packed bed in a reactor or column.

In another aspect, the present invention is directed to a mass transfer bed, and a reactor or column containing same, in which a plurality of the random packing elements described above are positioned in a generally random orientation to provide a zone in which mass and/or heat transfer between or among fluid streams may occur.

BRIEF DESCRIPTION OF THE DRAWINGS

In the accompanying drawings that form part of the specification and are to be read in conjunction therewith, and in which like reference numerals are used to indicate like parts in the various views.

DETAILED DESCRIPTION OF THE INVENTION

Referring now to the drawings in greater detail and initially to FIGS. 1-13, one embodiment of a generally saddle-shaped random packing element in accordance with the present invention is represented generally by the numeral 10. The packing element 10 comprises an arcuate body 11 formed in the shape of a partial torus. The arcuate body 11 can represent in the range of from about 5 to about 50 percent or from 10 to 25 percent of the volume of the torus. In the particular illustrated embodiment, the arcuate body 11 of packing element 10 represents approximately 25% of the volume of a complete torus.

The packing element 10 comprises a pair of laterally-spaced, longitudinally elongated, generally parallel, arcuate side members 12 and 14. The side members 12 and 14 optionally, but preferably, have radially upright flange elements 16 and 18 to thereby form two troughs 20 and 22 that serve to channel liquid along the surface of the packing element 10 in the direction of the longitudinal ends of the arcuate body 11 of packing element 10. The arcuate configuration of the side members 12 and 14 and the flanges 16 and 18 provide a configuration which is resistant to deformation, thereby allowing the use of less-expensive and lighter-gauge materials in comparison to certain prior art random packing elements. As an addition or alternative to the flange elements 16 and 18, the side members 12 and 14 may be strengthened by embossing, being formed in a sinusoidal or other wave profile, or by other methods.

The random packing element 10 also includes a plurality of inner and outer arched rib elements generally designated by the numerals 24 and 26, respectively. Rib elements 24 and 26 generally extend from and between side members 12 and 14 along the length of the arcuate body 11 of the packing element 10. Opposite ends of rib elements 24 and 26 are integral with, or are otherwise connected to, the side members 12 and 14, respectively. As used herein, the term "outer rib element" refers to a rib element extending in a direction generally outward away from the locus of the radius of the packing element's arcuate body 11. As used herein, the term "inner rib element" refers to a rib element extending in a direction generally inward toward the locus of the radius of the packing element's arcuate body 11. Each of the outer and/or inner rib elements 24 and 26 may extend generally outward and/or inward, respectively, along a radius of the arcuate body 11 of packing element 10. Alternately, some or all of the inner and/or outer rib elements 24 and 26 may extend at an angle intersecting the radius. Arrows 27a and 27b, respectively, generally designate the radially inward and the radially outward directions in relation to the packing element 10 in FIG. 1. The total number of inner and outer rib elements 24 and 26 can generally be in the range of from about 3 to about 20 or from 5 to 17. Four inner rib elements 24 and five outer rib elements 26 are present in the illustrated embodiment of packing element 10.

As illustrated in FIGS. 1-13, inner and outer arched rib elements 24 and 26 define a generally arcuate, interior volume 28 within the arcuate body 11 between, above and below the side members 12 and 14. The degree of accessibility of the interior volume for vapor and/or liquid passage can be facilitated in part by the size, shape, and orientation of inner and outer arched rib elements 24 and 26. In one embodiment, inner and outer arched rib elements 24 and 26 each extend generally radially and are essentially the same height.

Figure 2:
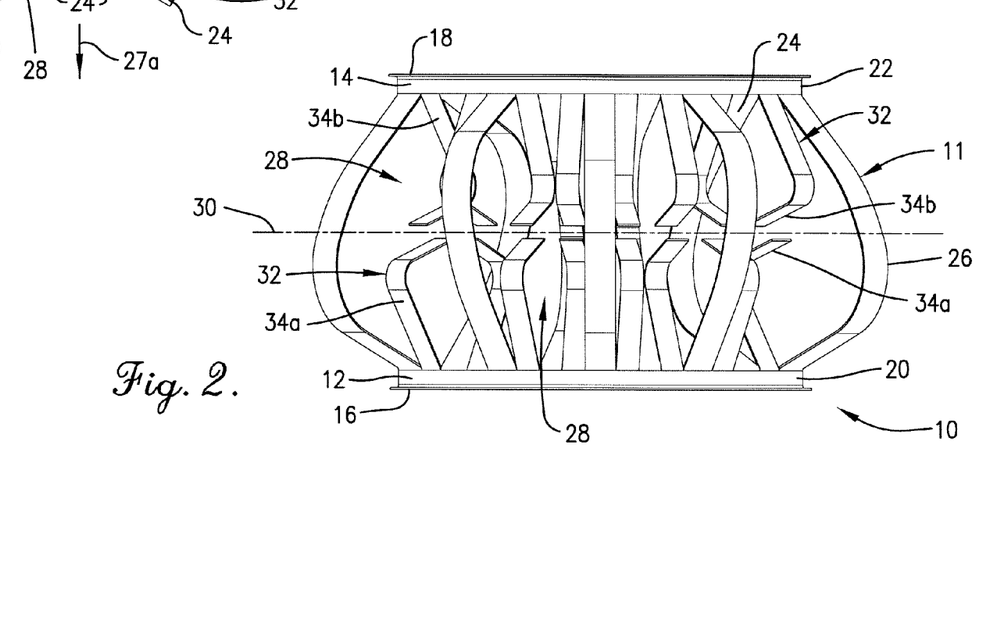
FIG. 2 is top plan view of the random packing element illustrated in FIG. 1, shown on a slightly enlarged scale from that shown in FIG. 1.
Figure 3:
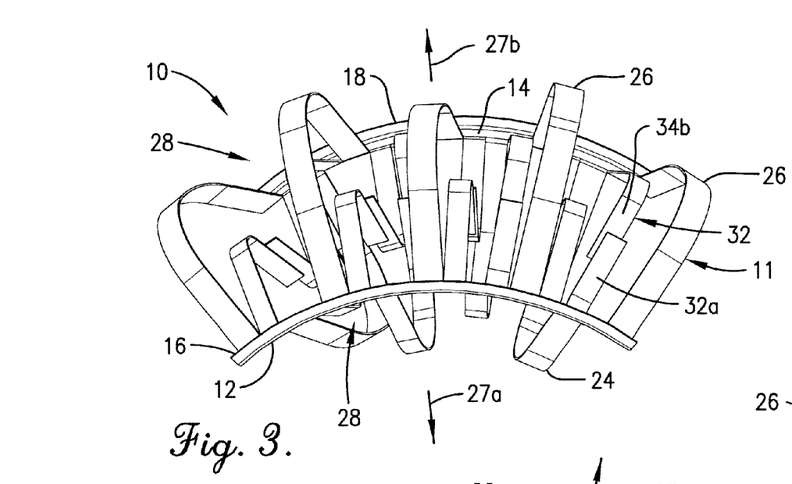
FIGS. 3 through 13 are various perspective views of the random packing element shown in FIGS. 1 and 2.
Figure 4:
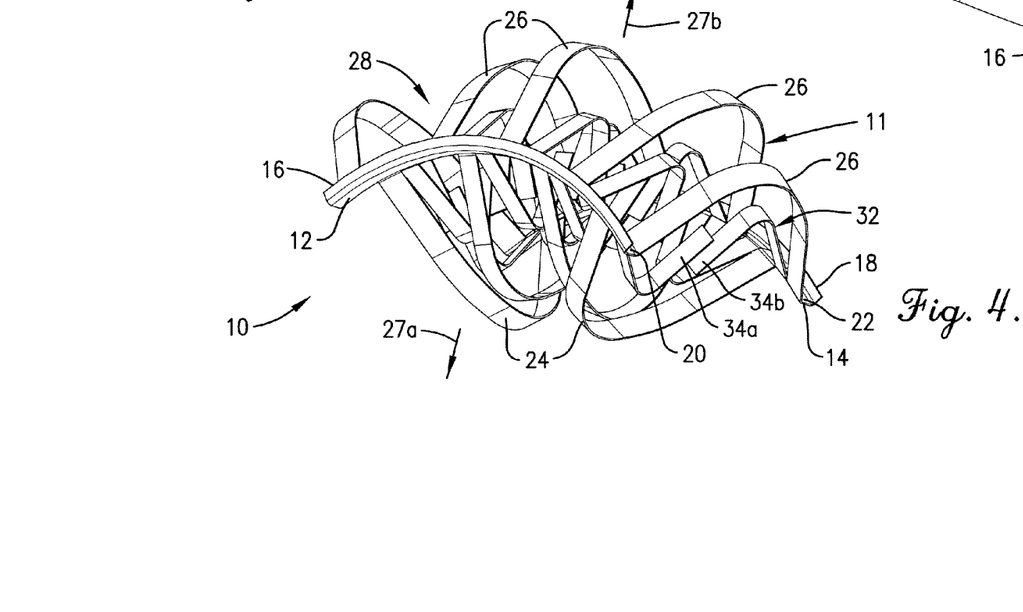
Figure 5:
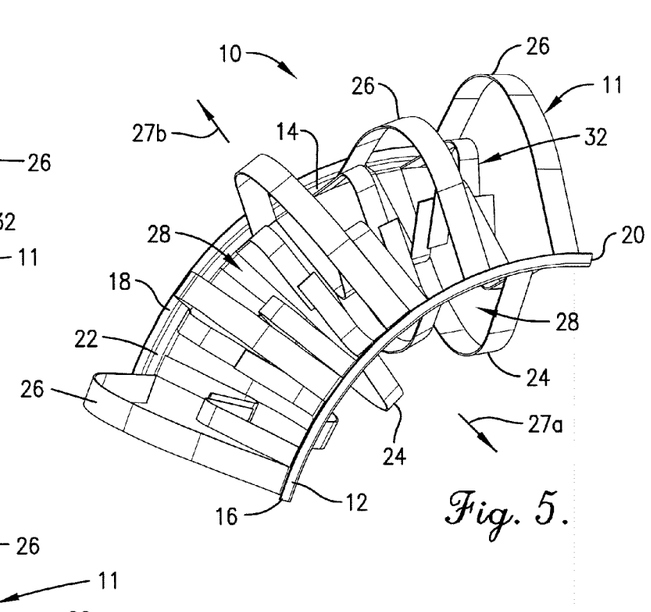
Figures 6, 7, 8:
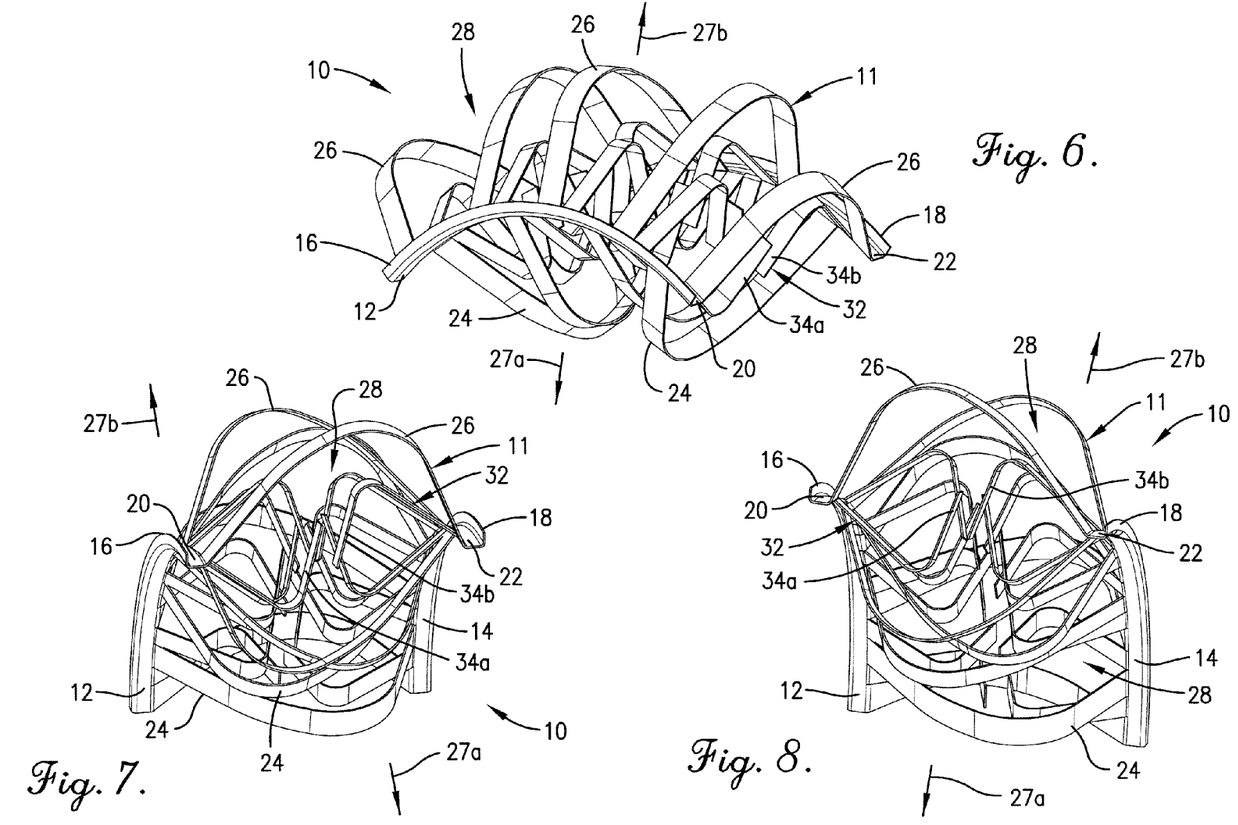
Figures 9, 10, 11:
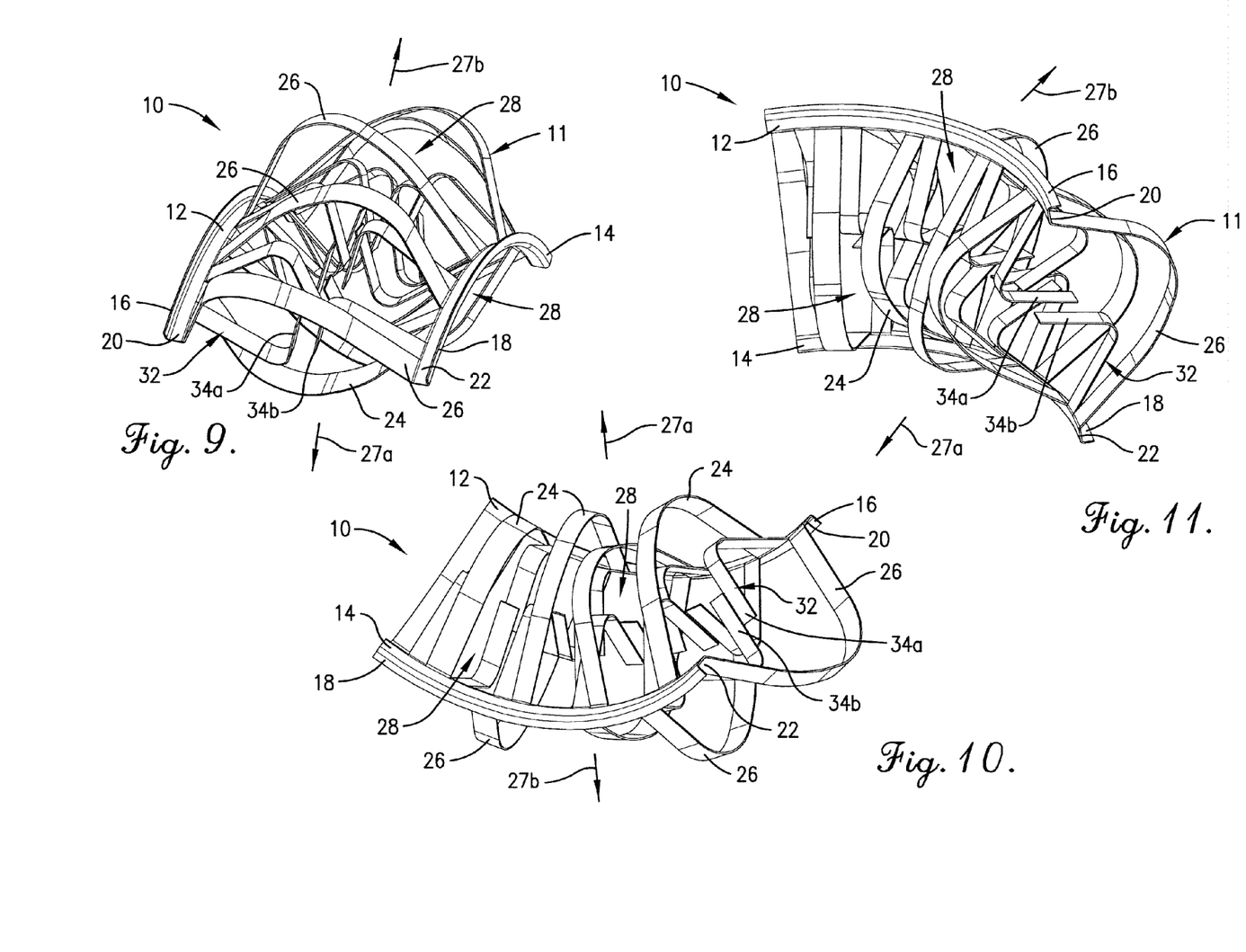
Figures 12, 13:
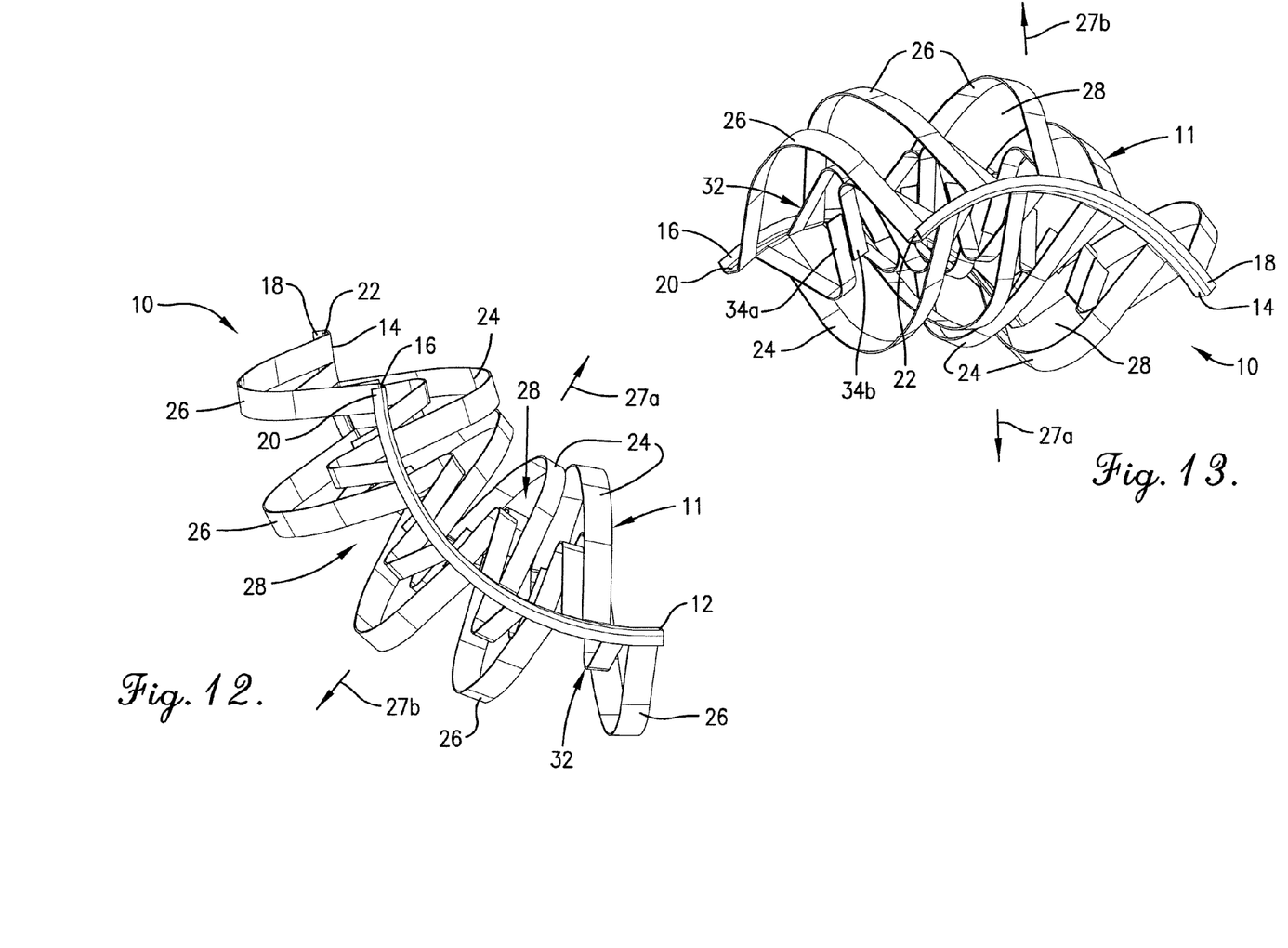
Figures 14, 15, 16:
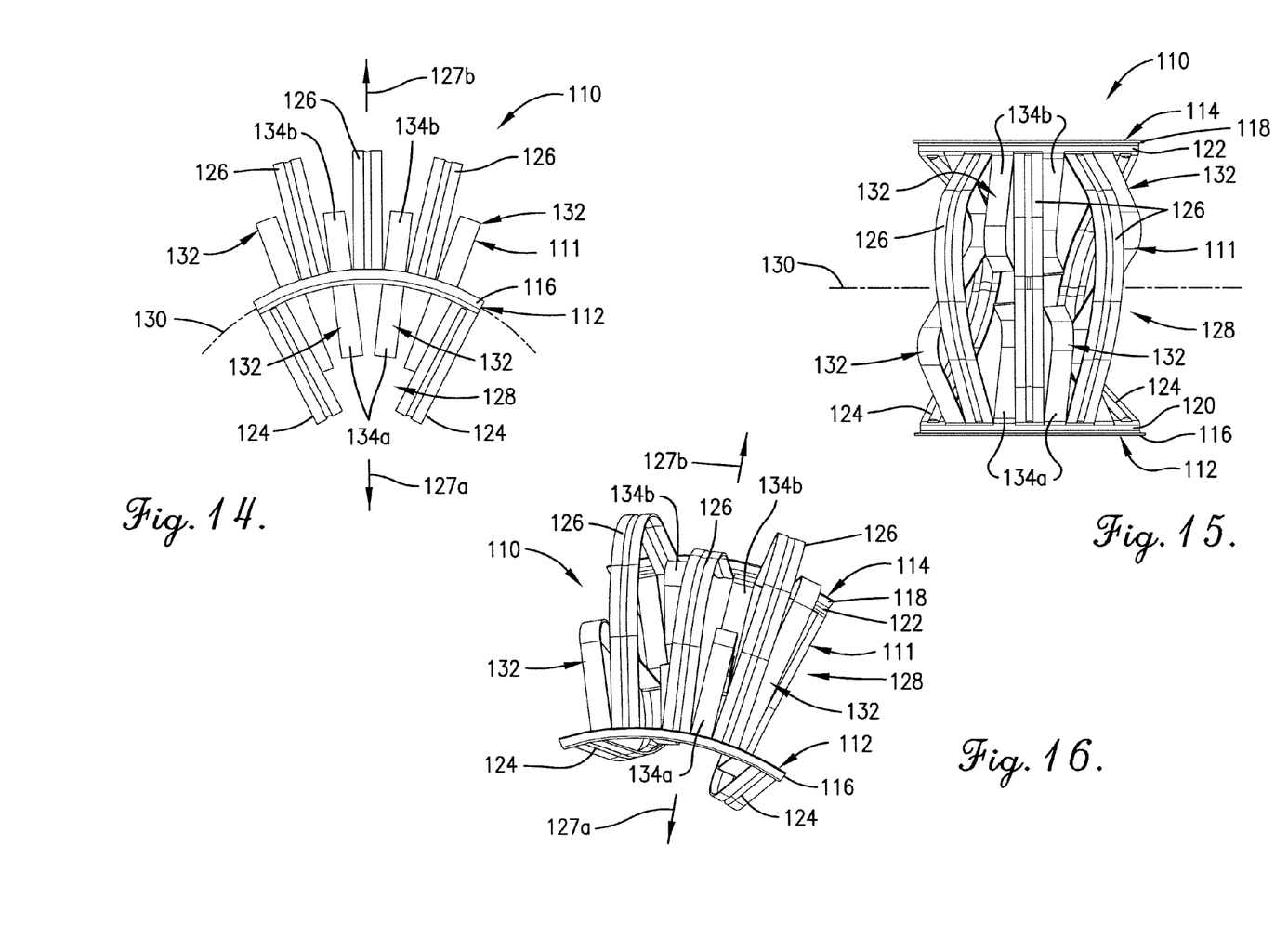
FIGS. 14 through 26 are various perspective views of another embodiment of a random packing element constructed in accordance with the present invention.
Figures 17, 18, 19:
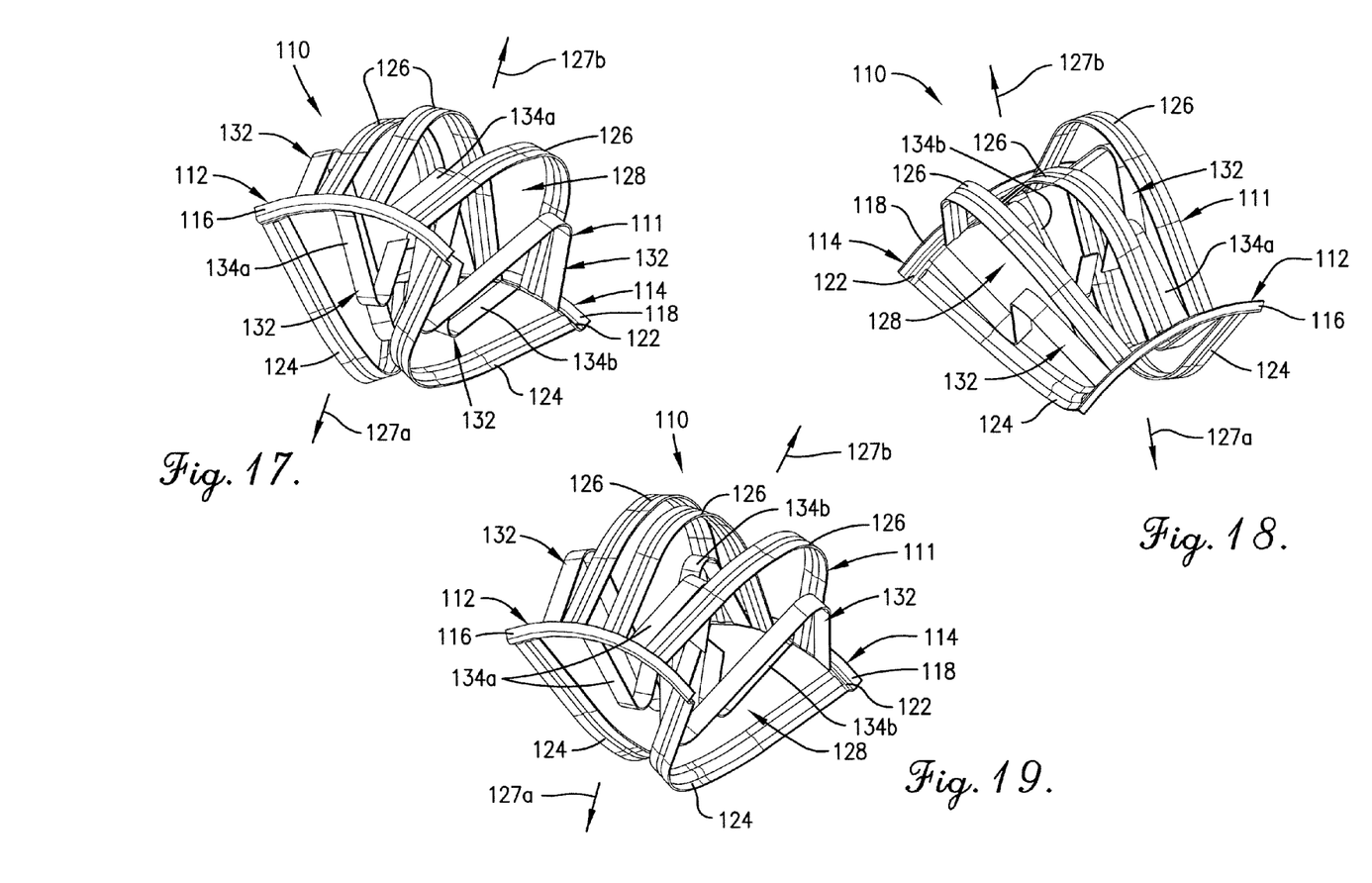
Figures 20, 21, 22:
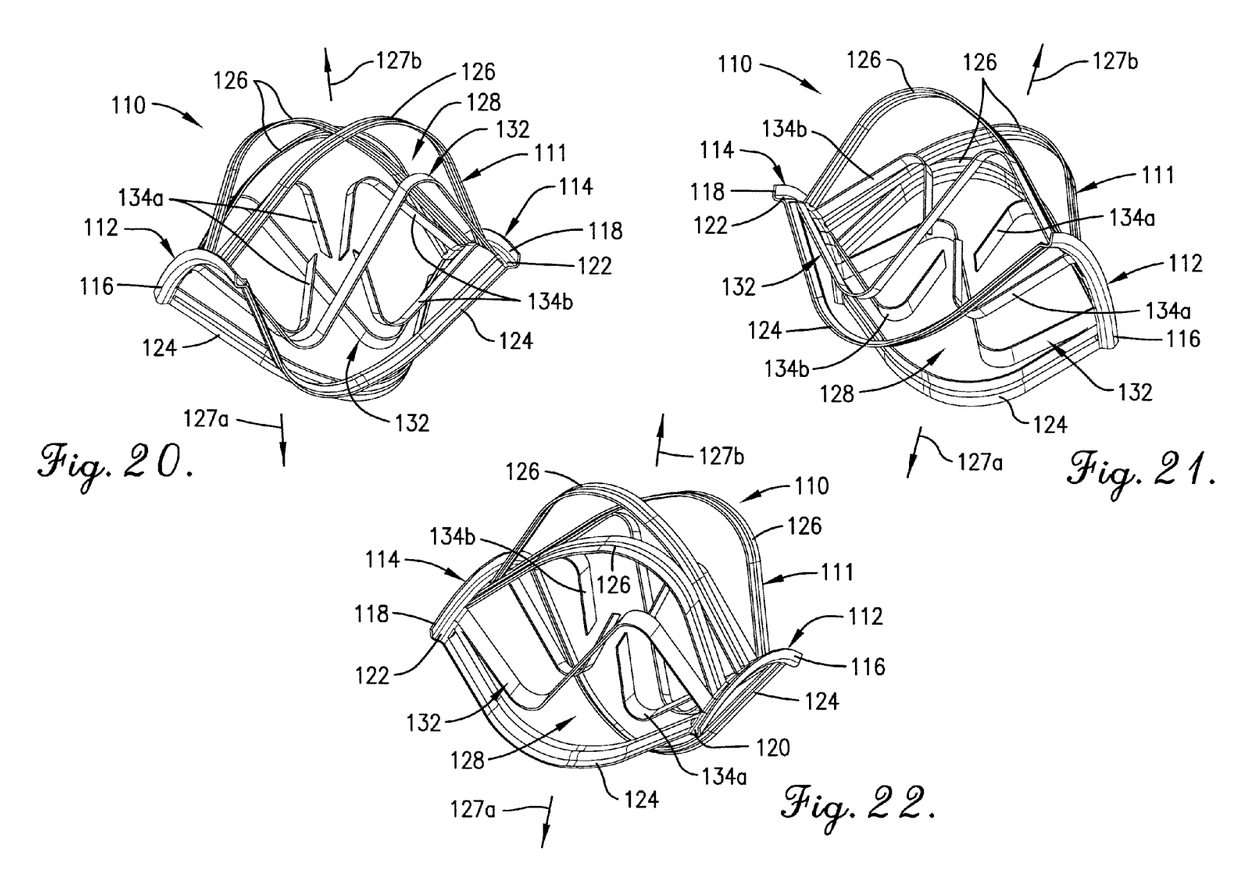
Figure 23:
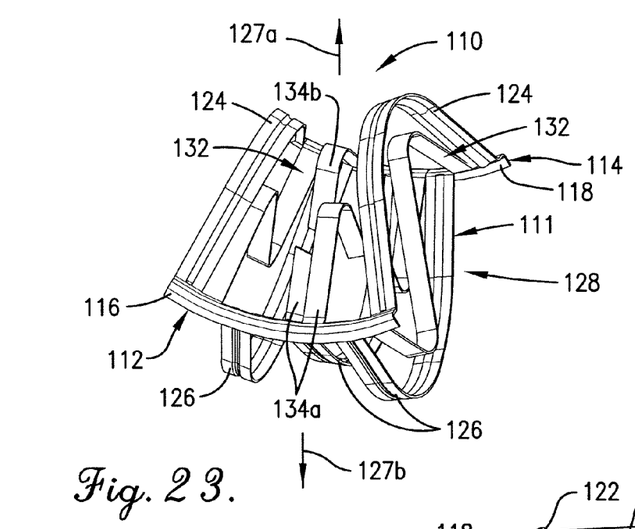
Figure 24:
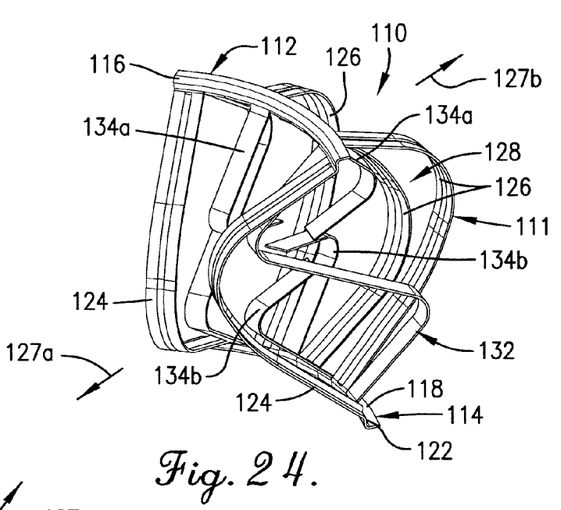
Figure 25:
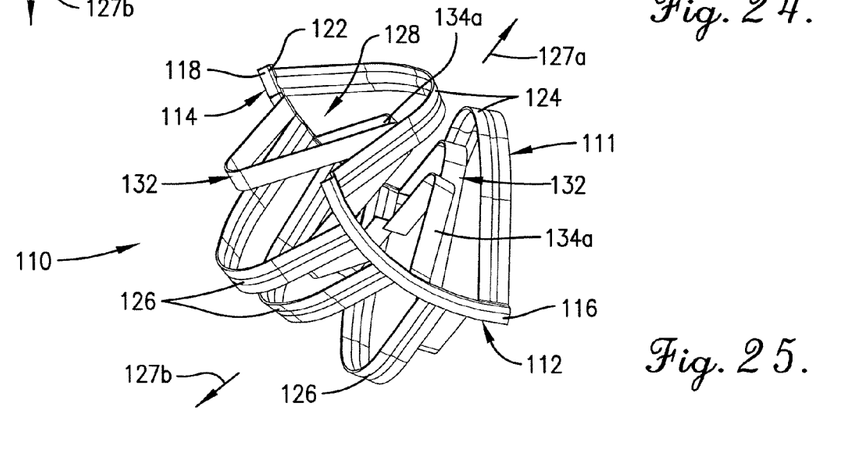
Figure 26:
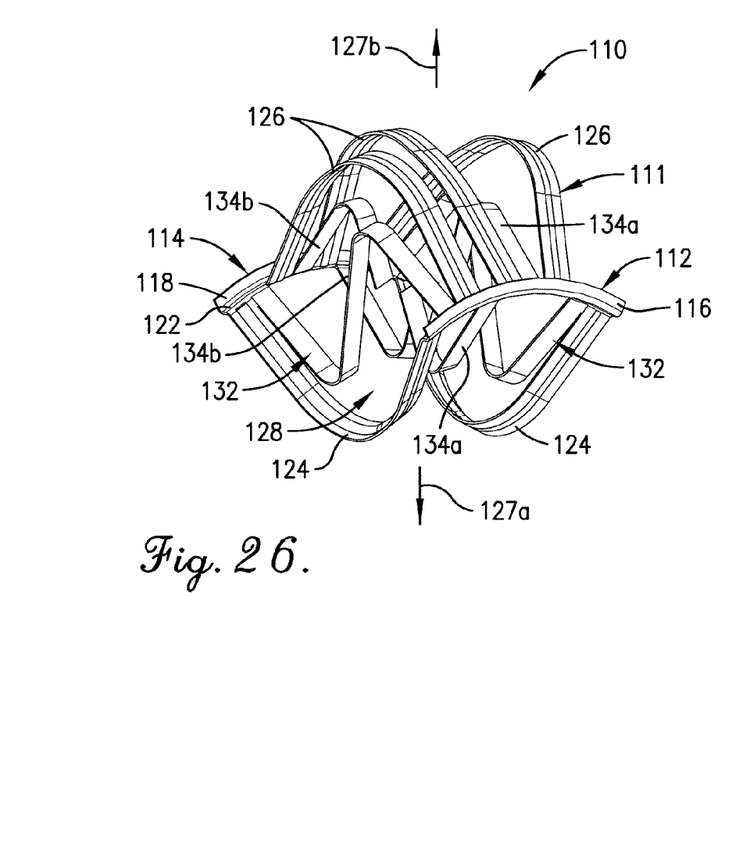

Rib elements 24 and 26 can be centrally longitudinally aligned, or, preferably, can be alternatingly misaligned from a center longitudinal axis 30 of the arcuate body, as best illustrated in FIG. 2. This misalignment creates points of vapor/liquid contact rather than the plane of fluid contact created by centrally aligned rib elements. In addition, the misalignment serves to open the longitudinal fluid flow path through interior volume 28 of the arcuate body 11 of packing element 10 by minimizing the shielding effect that results from consecutive, centrally aligned rib elements. Further, the longitudinal misalignment can reduce the tendency of one or more ribs of one random packing element 10 to become interposed within one or more rib elements of other random packing elements, 10 in a randomly packed bed, an occurrence sometimes referred to as "nesting." Nesting reduces mass transfer efficiency and can promote liquid and vapor channeling within the packed bed.

Figure 1:
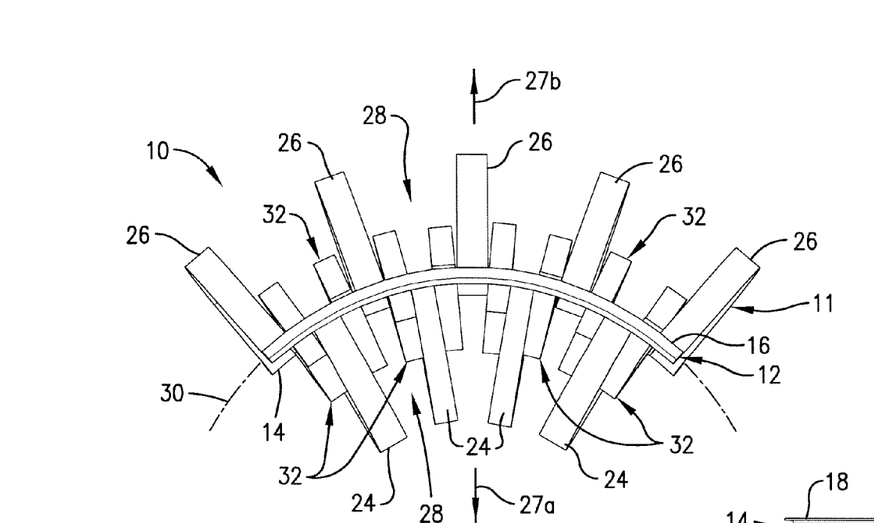
FIG. 1 is a side elevation view of one embodiment of the random packing element of the present invention.

The width of each inner rib element 24 and each outer rib element 26 may be independently selected for the desired performance in particular applications. As an example, the width of the outer rib elements 26 may be the generally the same as or up to or more than twice the width of the inner rib elements 24. Because of the curvature of the arcuate body of the packing element 10, the inner arched rib elements 24 are positioned more closely together as they extend radially inward, as is best seen in FIG. 1. Therefore, narrower inner arched rib elements 24 can minimize flow path restrictions experienced by fluid streams flowing through the packing element 10 in a radially outward direction designated by the arrow 27b. As can best be seen in FIG. 1, the inner rib elements 24 positioned further from the ends of the arcuate body 11 can have a smaller width than the inner rib elements 24 positioned closer to the ends so that more open space is provided between the inner rib elements 24. Additionally or alternatively, the number of inner rib elements 24 can be reduced and/or the inner rib elements can be bent outwardly from the radial direction to provide greater spacing between adjacent inner rib elements 24.

As an example, the width of the inner arched rib elements 24 can independently be greater than about 1 millimeter (mm), greater than about 1.5 mm, or greater than 2 mm. The width of the outer arched rib elements 26 can independently be less than about 5 mm, less than about 4.5 mm, or less than 4 mm in order to avoid the creation of stagnant, low-mass-transfer wake zones that form on the outer or downstream side of excessively wide rib elements. These wake zones are generally undesirable in that they reduce the mass transfer efficiency of the random packing element 10.

The packing element 10 additionally comprises one or more lesser rib elements 32 of a height which is less than inner and outer rib elements 24 and 26. Lesser rib element 32 is longitudinally disposed between consecutive alternating outer and inner rib elements 24 and 26 and, in one embodiment, is connected at its opposite ends to side members 12 and 14. In another embodiment, one or both ends of one or more of the lesser rib elements 32 may be joined to an adjacent rib element 32, 24, or 26, rather than the side members 12 and 14. The lesser rib element 32 is at least partly located in the interior volume 28 of the arcuate body 11 of packing element 10 to more evenly distribute the mass transfer surface throughout the volume of the packing element 10. Generally, at least about 20 percent, at least about 40 percent, or at least 50 percent of the total surface area of the random packing element 10 is located within the interior volume 28 of the arcuate body 11 of packing element 10. In the illustrated embodiment, approximately 38 percent of the total surface area of random packing element 10 is located within interior volume 28.

The lesser rib elements 32 may independently be continuous, discontinuous, or any combination thereof, and bent or shaped in any way. In one embodiment, one or more of the lesser rib elements may be continuous and bent, for example, in the form of a sine wave with one or more peaks and troughs that provide drip points within the interior arcuate space 28. As referred to herein, the term "drip point" refers to any continuous or discontinuous edge or point from which liquid may fall or drip. Drip points cause the liquid falling therefrom to form small droplets, which facilitate enhanced vapor contact to thereby increase mass transfer efficiency.

In another embodiment, one or more of the lesser rib elements 32 may be cut and made discontinuous, thereby forming two rib segments 34a and 34b that may be independently oriented within the interior volume 26 of the packing element 10. As one example, the rib segments 34 and 34b may remain substantially in the form of a sine wave, but with their free ends offset to form spaced apart drip points. In another example, the rib segments 34a and 34b may both be bent in the same radial directions to form mirror images of each other when viewed about a radial plane passing between the rib segments.

The width of the lesser rib elements 32 can be the same or different from the width of the inner and outer rib elements 24 and 26 that extend in the same radial direction. In the illustrated packing element 10, each lesser rib element 32 has approximately the same width as the two inner rib elements 24 that are positioned inwardly from the ends of the arcuate body 11.

The number and arrangement of the inner and outer rib elements 24 and 26 and the lesser rib elements 32 along the longitudinal length of the packing element 10 can be varied to suit particular applications. Preferably, the rib elements 24, 26, and 32 remain spaced apart from adjacent rib elements 24, 26, and 32 along their entire lengths, except at their respective ends, so that the packing element 10 has a more open configuration that reduces the opportunity for blocking the desired flow of fluids through the packing element 10. In order to reduce the opportunity for rib segments 34a and 34b in one packing element 10 to hook rib elements 24, 26, 32, 34a or 34b in other packing elements 10, it is generally desired that the rib segments 34a and 34b not be positioned on either longitudinal end of the packing element 10. Thus, the rib segments 34a and 34b are preferably positioned inwardly of the longitudinal ends of the packing elements so that they are shielded by rib elements 24, 26 or 32 which are positioned at the ends of the packing element 10.

In the illustrated embodiment of the packing element 10, each lesser rib element 32 is positioned between a pair of inner and outer rib elements 24 and 26. It is, of course, possible to independently position each of the lesser rib elements 32 between pairs of outer rib elements 26, between pairs of inner rib elements 24, or between any paired combination of rib elements 32, inner rib elements 24, and outer rib elements 26. In the illustrated embodiment of the packing element 10, inner rib elements 24 are at the ends of packing element 10, and four lesser rib elements 32 are distributed between alternating inner and outer rib elements 24 and 26, with the two centrally positioned lesser rib elements 32 being severed to form equal-length rib segments 34a and 34b. The number and arrangement of the various rib elements 24, 26, 32, 34a and 34b can be varied to suit specific applications.

Another embodiment of a packing element of the present invention is shown in FIGS. 14-26 and is broadly designated by the numeral 110. Packing element 110 is similar to packing element 10 and the same reference numerals preceded by the prefix "1" are used to designate the similar elements.

Packing element 110 comprises an arcuate body 111 formed in the shape of a partial torus. The arcuate body 111 defines approximately 15% of the volume of a torus. The packing element 110 includes curved side members 112 and 114 which include flange elements 116 and 118, respectively, that form troughs 120 and 122 that channel liquid to the longitudinal ends of the arcuate body 111.

An inner arched rib element 124 is positioned at both longitudinal ends of the arcuate body 111 and outer arched rib elements 126 are positioned at intermediate positions along the side members 112 and 114. The inner rib elements 124 extend generally in a radially inward direction represented by the arrow 127a and the outer rib elements 126 extend in a radially outward direction as designated by arrow 127b. Together, the inner and outer rib elements 124 and 126 define a generally arcuate interior volume 128 having a center longitudinal axis 130.

Four lesser rib elements 132 are positioned between adjacent pairs of inner and outer rib elements 124 and 126. Each of the two innermost lesser rib elements 132 is discontinuous and forms rib segments 134a and 134b. The rib segments 134a and 134b and the rib elements 124, 126 and 132 can be constructed, positioned, and oriented as previously described with respect to the corresponding elements in packing element 10. In the illustrated embodiment, approximately 36 percent of the total surface area of random packing element 110 is located within interior volume 128. Preferably, the rib elements 124, 126, and 132 remain spaced apart from adjacent rib elements 124, 126, and 132 along their entire lengths, except at their respective ends, so that the packing element 110 has a more open configuration that reduces the opportunity for blocking the desired flow of fluids through the packing element 110.

The random packing elements 10 and 110 of the present invention may be made from a variety of materials, including, for example, ceramic, plastic, or metal. The random packing elements 10 and 110 may be strengthened by work hardening, by texturing at least a portion of the element's surface, embossing at least a portion of the element's surface with dimples on one or both sides of at least a portion of the element and/or by embossing a curved cross section to the various rib elements 124, 126, and 130 as shown with respect to packing element 110. The curved cross section preferably extends sufficiently far into the side members 112 and 114 to provide a structure that serves to disrupt the flow of fluid along troughs 120 and 122 and cause it to be redirected onto the rib elements 124, 126, and 132 rather than being allowed to flow to the ends of the packing element 110. Dimples or other flow disrupting structures can be positioned in the troughs 120 and 122 to achieve the same purpose. The same construction may also be used in connection with packing element 10.

The random packing elements 10 and 110 may be manufactured by a variety of techniques. In one embodiment, the random packing elements of the present invention may be manufactured by the procedure described in U.S. Pat. No. 5,112,536, incorporated herein by reference, wherein the packing elements are each formed from a single, flat sheet of material and the inner, outer, and lesser rib elements together with the side members, comprise substantially the total surface area of the sheet material.

Figure 27:
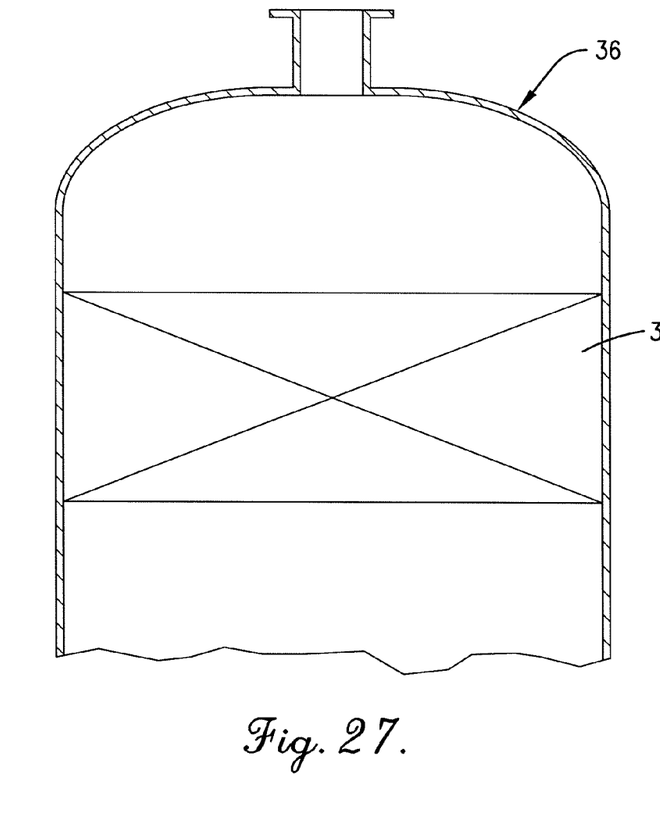
FIG. 27 is a fragmentary schematic view of a column or reactor containing a packed bed formed from the random packing elements of the present invention.

Turning to FIG. 27, a plurality of the random packing elements 10 and 110 can be used to provide mass and/or heat transfer surface area in a reactor and/or in a vapor/liquid or liquid/liquid contacting tower 36. The random packing elements 10 and/or 110 may be dumped into the suitable supports in the column or reactor 36 to form a packed bed 38 or they may be pre-arranged in a packed bed formation in a generally random orientation prior to placement in the column or reactor 36. The previously-discussed shape and configuration of the packing elements of the present invention create open, easily accessible fluid flow paths and present a relatively uniform surface area distribution when viewed at multiple angles, which result in generally orientation-independent element performance.

The following Examples illustrate the orientation-independent performance of the inventive random packing element and is not intended to limit the scope of the invention in any way.

Example 1

The mass transfer coefficient was calculated for three different random packing elements: Comparative Element 1, a saddle-shaped random packing of the type illustrated in U.S. Pat. No. 4,303,599; Comparative Element 2, a saddle-shaped random packing element of the type illustrated in U.S. Pat. No. 5,882,772; and Inventive Element 3, the packing element 10 illustrated in FIGS. 1-13.

The mass transfer coefficient for each packing element was calculated for each of ten different packing orientations, labeled A through I in Table 1, below. Orientations A through I correspond to the element being positioned at 0°, 45°, and 90° from the base position for each of the three Cartesian axes. For each packing element, the mass transfer coefficient range was determined by subtracting the minimum from the maximum mass transfer coefficient among each position A through I. The average mass transfer coefficient for each packing element was then determined by averaging the individual mass transfer coefficients calculated for each orientation A through I.

In general, higher mass transfer coefficients indicate elements with higher mass transfer efficiency and narrower mass transfer coefficient ranges indicate less variability in the element's performance with changing orientation. The mass transfer coefficient for orientations A through I, the mass transfer coefficient range, and the average mass transfer coefficient for Comparative Elements 1 and 2 and Inventive Element 3 are presented in Table 1.

TABLE 1

Mass Transfer Coefficients for Random Packing Elements

| Orientation | Comparative Element 1 | Comparative Element 2 | Inventive Element 3 |
| --- | --- | --- | --- |
| A | 1.00 | 1.02 | 1.18 |
| B | 1.05 | 1.02 | 1.09 |
| C | 0.97 | 0.87 | 1.09 |
| D | 0.96 | 1.02 | 1.20 |
| E | 1.05 | 1.02 | 1.18 |
| F | 1.08 | 0.98 | 1.09 |
| G | 1.07 | 1.00 | 1.10 |
| H | 1.08 | 1.00 | 1.13 |
| I | 1.10 | 1.06 | 1.12 |
| Range | 0.19 | 0.14 | 0.11 |
| Average | 1.04 | 1.00 | 1.13 |

As shown in Table 1, Inventive Element 3 has a lower mass transfer coefficient range, a higher mass transfer coefficient for each orientation, and a higher average mass transfer coefficient than Comparative Elements 1 and 2. Therefore, Inventive Element 3 has a more efficient, less orientation-specific performance than Comparative Elements 1 and 2.

Example 2

Testing was conducted comparing the performance of the Inventive Element (packing element 110 shown in FIGS. 14-26) to that of four types of commercially-available random packings. A mixture of light hydrocarbons was distilled at total reflux. The tower was run at a pressure significantly higher than atmospheric pressure—very typical of the conditions at which these mixtures are being processed in industry, and very typical for the conditions at which random packing is often used. The tower diameter and bed depth were large enough to ensure that industrially relevant data were generated. Liquid samples from above and below the packed bed were analyzed to measure the packing efficiency. The maximum capacity of the packing was determined by increasing the heat input until the pressure drop increased very steeply with any additional heat input and entrainment from the top of the bed was significant (loss of efficiency). The results of the comparative testing are presented in Table 2.

TABLE 2

| Packing type | Relative Capacity | Relative Efficiency | Relative Specific Surface Area |
|---|---|---|---|
| Saddle-shaped high performance metal random packing: small size | 1.00 | 1.28 | 1.66 |
| Saddle-shaped high performance metal random packing: larger size | 1.09 | 1.00 | 1.10 |
| Sinusoidally-shaped metal random packing: small size | 1.09 | 1.13 | 1.45 |
| Sinusoidally-shaped metal random packing: larger size | 1.17 | 0.89 | 1.00 |
| Inventive Element | 1.09 | 1.22 | 1.12 |

The test results demonstrate that Inventive Element achieved the same or higher relative capacity and/or a higher relative efficiency using a smaller relative specific surface area than the comparative packing elements. The Inventive Element thus achieved both favorable relative capacity and relative efficiency using a small relative specific surface area.

From the foregoing, it will be seen that this invention is one well adapted to attain all the ends and objectives hereinabove set forth, together with other advantages that are inherent to the structure.

It will be understood that certain features and subcombinations are of utility and may be employed without reference to other features and subcombinations. This is contemplated by and is within the scope of the claims.

Since any possible embodiments may be made of the invention without departing from the scope thereof, it is to be understood that all matter herein set forth or shown in the accompanying drawings is to be interpreted as illustrative and not in a limiting sense.

What is claimed is:

1. A saddle-shaped random packing element comprising:
   a pair of laterally spaced, longitudinally elongated, arcuate side members which cooperatively define a curved longitudinal axis therebetween;
   a plurality of oppositely extending arched inner and outer rib elements extending from and between said side members to cooperatively define an interior volume therebetween; and
   at least one lesser rib element longitudinally disposed between said inner and outer arched rib elements, and at least partly disposed in said interior volume,
   wherein at least about 20 percent of the total surface area of said saddle-shaped random packing element is defined within said interior volume.

2. The packing element of claim 1, wherein the total number of said inner rib elements plus said outer rib elements is in the range of from about three to about twenty.

3. The packing element of claim 1, including a plurality of said lesser rib elements and wherein at least one of the lesser rib elements is discontinuous to thereby create first and second rib segments.

4. The packing element of claim 3, wherein said first and second rib segments are bent in radially opposite directions.

5. The packing element of claim 3, wherein said first and second rib segments are bent in the same radial direction.

6. The packing element of claim 1, wherein said packing element represents about 5 to about 50 percent of the volume of a torus.

7. The packing element of claim 1, wherein said packing element represents about 10 to about 25 percent of the volume of a torus and including a plurality of said lesser rib elements.

8. The packing element of claim 1, wherein said outer and inner rib elements are generally alternatingly misaligned from said longitudinal axis.

9. The packing element of claim 1, wherein the width of at least one of said outer rib elements is the same as greater than the width of at least one of said inner rib elements.

10. The packing element of claim 1, wherein the width of said outer rib elements is less than about 5 millimeters and/or the width of said inner rib elements is greater than about 1 millimeters.

11. The packing element of claim 1, wherein at least one of the lesser rib elements is at least partly continuous.

12. The packing element of claim 1, wherein at least a portion of said total surface area of said packing element is textured.

13. The packing element of claim 1, wherein at least some of said inner and outer rib elements have a cupped cross section.

14. The packing element of claim 1, wherein said packing element is formed of metal.

15. The packing element of claim 1, wherein said packing element is formed of plastic.

16. The packing element of claim 1, including a structure positioned in one or both of the side members to direct fluid flow from the one or both side members onto one or more of the inner and outer rib elements and lesser rib element.

17. A column or reactor containing a packed bed comprising a plurality of packing elements of claim 1.

18. A saddle-shaped random packing element comprising:
    a pair of laterally spaced, longitudinally elongated, arcuate side members which cooperatively define a curved longitudinal axis therebetween;
    a plurality of oppositely extending arched inner and outer rib elements extending from and between said side members to cooperatively define an interior volume therebetween; and
    at least one lesser rib element longitudinally disposed between said inner and outer arched rib elements, and at least partly disposed in said interior volume,
    wherein at least about 20 percent of the total surface area of said saddle-shaped random packing element is defined within said interior volume, and
    wherein said packing element represents about 10 to about 25 percent of the volume of a torus.

19. The packing element of claim 18, wherein the total number of said inner rib elements plus said outer rib elements is five.

20. The packing element of claim 19, wherein about 36 percent of the total surface area of said saddle-shaped random packing element is defined within said interior volume.

21. The packing element of claim 19, wherein at least one of said lesser rib elements is discontinuous to thereby create first and second rib segments.

22. The packing element of claim 21, wherein said first and second rib segments are bent in radially opposite directions.

23. The packing element of claim 21, wherein said first and second rib segments are bent in the same radial direction.

24. The packing element of claim 19, wherein at least one of said lesser rib elements is continuous.

25. The packing element of claim 18, wherein the total number of said inner rib elements plus said outer rib elements is three.

26. The packing element of claim 25, wherein about 36 percent of the total surface area of said saddle-shaped random packing element is defined within said interior volume.

27. A saddle-shaped random packing element comprising:
a pair of laterally spaced, longitudinally elongated, arcuate side members which cooperatively define a curved longitudinal axis therebetween;
a plurality of oppositely extending arched inner and outer rib elements extending from and between said side members to cooperatively define an interior volume therebetween; and
at least one lesser rib element longitudinally disposed between said inner and outer arched rib elements, and at least partly disposed in said interior volume,
wherein at least about 20 percent of the total surface area of said saddle-shaped random packing element is defined within said interior volume, and
wherein the total number of said inner rib elements plus said outer rib elements is five.

28. The packing element of claim 27, wherein at least one of said lesser rib elements is discontinuous to thereby create first and second rib segments.

29. The packing element of claim 28, wherein said first and second rib segments are bent in radially opposite directions.

30. The packing element of claim 28, wherein said first and second rib segments are bent in the same radial direction.

31. The packing element of claim 28, wherein at least one of said lesser rib elements is continuous.

32. A saddle-shaped random packing element comprising:
a pair of laterally spaced, longitudinally elongated, arcuate side members which cooperatively define a curved longitudinal axis therebetween;
a plurality of oppositely extending arched inner and outer rib elements extending from and between said side members to cooperatively define an interior volume therebetween; and
at least one lesser rib element longitudinally disposed between said inner and outer arched rib elements, and at least partly disposed in said interior volume,
wherein about 36 percent of the total surface area of said saddle-shaped random packing element is defined within said interior volume.

33. The packing element of claim 32, wherein at least one of said lesser rib elements is discontinuous to thereby create first and second rib segments.

34. The packing element of claim 33, wherein said first and second rib segments are bent in radially opposite directions.

35. The packing element of claim 33, wherein said first and second rib segments are bent in the same radial direction.

36. The packing element of claim 33, wherein at least one of said lesser rib elements is continuous.

37. A saddle-shaped random packing element comprising:
a pair of laterally spaced, longitudinally elongated, arcuate side members which cooperatively define a curved longitudinal axis therebetween;
a plurality of oppositely extending arched inner and outer rib elements extending from and between said side members to cooperatively define an interior volume therebetween; and
a plurality of lesser rib elements, each lesser rib element being longitudinally disposed between said inner and outer arched rib elements and at least partly disposed in said interior volume,
wherein about 36 percent of the total surface area of said saddle-shaped random packing element is defined within said interior volume,
wherein said packing element represents about 10 to about 25 percent of the volume of a torus, and
wherein the total number of said inner rib elements plus said outer rib elements is five.

38. The packing element of claim 37, wherein at least one of said lesser rib elements is discontinuous to thereby create first and second rib segments.

39. The packing element of claim 38, wherein said first and second rib segments are bent in radially opposite directions.

40. The packing element of claim 38, wherein said first and second rib segments are bent in the same radial direction.

41. The packing element of claim 38, wherein at least one of said lesser rib elements is continuous.

* * * * *